(12) United States Patent
Lowe et al.

(10) Patent No.: US 9,317,385 B2
(45) Date of Patent: Apr. 19, 2016

(54) HARDWARE PROFILING

(71) Applicant: Samsung Electronics Co., Ltd., Suwon-si, Gyeonggi-do (KR)

(72) Inventors: William M. Lowe, Austin, TX (US); Christopher F. Kiszely, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 99 days.

(21) Appl. No.: 14/264,025

(22) Filed: Apr. 28, 2014

(65) Prior Publication Data

US 2015/0186238 A1 Jul. 2, 2015

Related U.S. Application Data

(60) Provisional application No. 61/922,085, filed on Dec. 30, 2013.

(51) Int. Cl.
*G06F 11/00* (2006.01)
*G06F 11/27* (2006.01)

(52) U.S. Cl.
CPC ..................... *G06F 11/27* (2013.01)

(58) Field of Classification Search
USPC .......................................... 714/30
See application file for complete search history.

(56) References Cited

U.S. PATENT DOCUMENTS

| | | | |
|---|---|---|---|
| 6,678,645 B1 | 1/2004 | Rajsuman et al. | |
| 7,647,528 B2 | 1/2010 | Yilmaz et al. | |
| 8,484,007 B2 | 7/2013 | Xiao et al. | |
| 2003/0233601 A1* | 12/2003 | Vaid. ................... | G06F 11/3648 714/42 |
| 2011/0041017 A1 | 2/2011 | Zhong et al. | |
| 2013/0091389 A1* | 4/2013 | Swoboda ............ | G06F 11/3476 714/45 |
| 2013/0179863 A1 | 7/2013 | Vangala et al. | |
| 2014/0108872 A1* | 4/2014 | Palmer ................ | G06F 11/3466 714/45 |

OTHER PUBLICATIONS

DeOrio et al., "Post-Silicon Bug Diagnosis with Inconsistent Executions", Computer-Aided Design (ICCAD), 2011 IEEE/ACM International Conference, pp. 755-761. IEEE, 2011. URL: http://andrewdeorio.com/doc/ICCAD11BPS-slides.pdf.

(Continued)

*Primary Examiner* — Sarai Butler
(74) *Attorney, Agent, or Firm* — Renaissance IP Law Group LLP

(57) ABSTRACT

According to one general aspect, an apparatus may include a trace control register, a first output path, and a second output path. The trace control register may be configured to receive one or more signals output by a combinatorial logic block. The trace control register may include a first register portion configured to capture the one or more signals. The trace control register may include a second register portion configured to capture whether an event occurred within the combinatorial logic block. The occurrence of the event is determined by at least a portion of the one or more signals having a predetermined state. The first output path configured to select between a plurality of captured signals provided by respective trace control registers. The second output path configured to output one or more captured events provided by one or more respective trace control registers.

23 Claims, 5 Drawing Sheets

(56) References Cited

OTHER PUBLICATIONS

Ko et al., "On Automated Trigger Event Generation in Post-Silicon Validation", Proceedings of the Conference on Design, Automation and Test in Europe, pp. 256-259. ACM, 2008.

Quinton et al., "Post-Silicon Debug of Complex Multi Clock and Power Domain ICs", IEEE International Workshop on Silicon Debug and Diagnosis. 2010. URL: http://www.ensc.sfu.ca/~lshannon/courses/ensc894/wilton_sdd.pdf.

* cited by examiner

HARDWARE PROFILING

CROSS-REFERENCE TO RELATED APPLICATION

This application claims priority under 35 U.S.C. §119 to Provisional Patent Application Ser. No. 61/922,085, entitled "HARDWARE PROFILING" filed on Dec. 30, 2013. The subject matter of this earlier filed application is hereby incorporated by reference.

TECHNICAL FIELD

This description relates to hardware validation, and more specifically to logical testing coverage.

BACKGROUND

Traditionally, testing or validating integrated circuits has included functional testing. Functional testing generally involves providing various inputs to the integrated circuit (or part thereof) and testing whether the outputs of the integrated circuit are correct or as expected. Often part of that functional testing has involved "logical coverage", which assures that the suite of functional tests causes the integrated circuit to perform a full or major portion of the possible combinations of actions or operations possible. In general, the higher the amount of coverage the more thoroughly the integrated circuit is considered to have been tested.

Traditionally, logical coverage has typically been the domain of pre-silicon analysis. That is to say, the ability of circuit simulation to view and analyze all or most parts of a circuit design makes coverage analysis rather straightforward. Therefore, logical coverage has traditionally occurred prior to the actual manufacture of the integrated circuit.

Unfortunately, the lack of visibility into the inner workings of the integrated circuit and the lack of compute power to analyze actual field use cases make post-silicon testing and coverage difficult. Post-silicon processes allow multiple orders of increased magnitude of operational testing, but lack the ability to look inside of the product at key transactions or units to assess whether they are adequately stimulated. As a result, post-silicon validation is typically performed with little to no ability to assess the coverage of the tests that are being applied.

SUMMARY

According to one general aspect, an apparatus may include a trace control register, a first output path, and a second output path. The trace control register may be configured to receive one or more signals output by a combinatorial logic block. The trace control register may include a first register portion configured to capture the one or more signals. The trace control register may include a second register portion configured to capture whether an event occurred within the combinatorial logic block. The occurrence of the event is determined by at least a portion of the one or more signals having a predetermined state. The first output path configured to select between a plurality of captured signals provided by respective trace control registers. The second output path configured to output one or more captured events provided by one or more respective trace control registers.

According to another general aspect, a method may include receiving, by a trace control register, an input signal output by a combinatorial logic block. The method may include capturing, by a first register portion, the input signal to form a captured signal. The method may include capturing, by a second register portion, whether an event occurred within the combinatorial logic block to form a captured event. The occurrence of the event is based, at least in part, upon the input signal. The method may include outputting the captured signal via a first output path configured to select between a plurality of captured signals provided by respective trace control registers. The method may include outputting the captured event via a second output path configured to output one or more captured events provided by one or more respective trace control registers.

According to another general aspect, a system may include a trace control register, a memory, and an access port. The trace control register may be configured to receive one or more signals. The trace control register may include a first register portion configured to generate one or more captured signals by capturing the one or more signals, and a second register portion configured to capture whether an event occurred within a combinatorial logic block. The occurrence of the event may be determined by at least a portion of the one or more signals. The memory may be configured to store the one or more captured signals. The access port may be configured to output the captured event.

The details of one or more implementations are set forth in the accompanying drawings and the description below. Other features will be apparent from the description and drawings, and from the claims.

A system and/or method for hardware validation, and more specifically to logical testing coverage, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
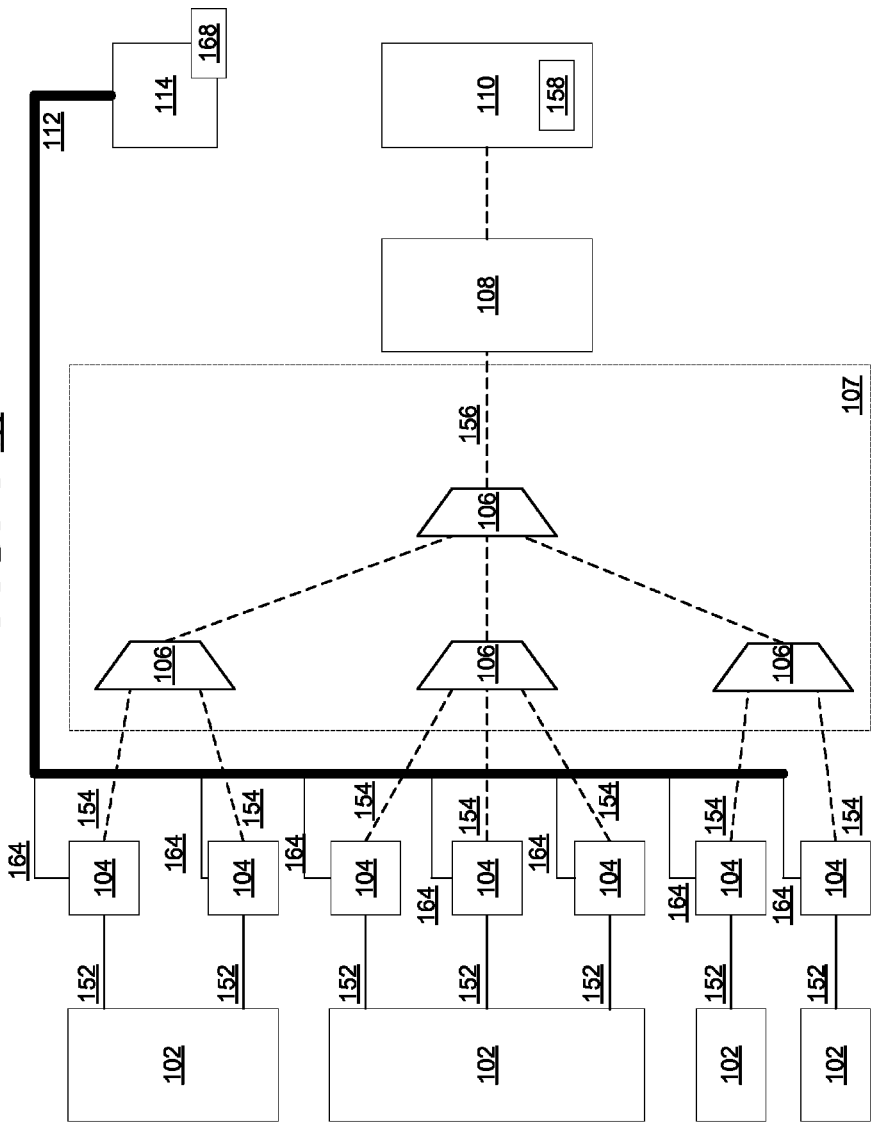
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include an integrated circuit, such as, for example, a processor, a system-on-a-chip (SoC), etc. In some embodiments, the system 100 may be included in a computing device, such as, for example, a laptop, desktop, workstation, personal digital assistant, smartphone, tablet, cloud server, storage server, and other appropriate computers, etc.

In various embodiments, the system 100 may include one or more functional unit blocks (FUBs) or combinational logic blocks (CLBs) 102. In such an embodiment, a combinational logic block 102 may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

In various embodiments, the system 100 may include one or more trace control registers (TCRs) 104. In such an embodiment, a TCR 104 may be configured to receive one or more signals 152 output by a combinatorial logic block 102. In such an embodiment, one or more of the CLBs 102 may output various signals 152.

Traditionally, a CLB 102 may output various signals to other CLBs 102 or output pins of the integrated circuit. In such an embodiment, information may pass through a data pipeline (e.g., from instruction fetch unit to instruction decode unit to execution unit, etc.). However, in the illustrated embodiment, the CLBs 102 may also output the signals 152. In such an embodiment, the signals 152 may include signals that are traditionally only available internally to the CLB 102. The outputting of these signals 152 may provide a window or an increased amount of visibility to the inner workings of the CLB 102. In such an embodiment, these signals 152 may allow a post-silicon debugger or testing agent a level of visibility similar or closer to that provided to pre-silicon simulation testing agents. In some embodiments, the signals 152 may also include signals that are normally or traditionally output between CLBs 102; however, these signals may additionally be routed or input to the TCRs 104. It is understood that the above are merely a few illustrative examples to which the disclosed subject matter is not limited.

In various embodiments, each TCR 104 may receive a sub-set or dedicated number of these signals 152 from a respective CLB or CLBs 102. In some embodiments, a CLB 102 may output multiple groups of signals 152 to multiple respective TCRs 104. For example, a large CLB 102 may output 64 signals to four TCRs 104 such that each TCR 104 receives 16 signals 152. It is understood that the above is merely one illustrative example to which the disclosed subject matter is not limited.

In one embodiment, the TCR 104 may be configured to capture or records one or more of the signals 152. In such an embodiment, the TCRs 104 may serve as a form of on-board debug logic within the system 100. Such debug logic may allow the inner workings of the CLBs 102 to be captured and eventually output from the system 100 in order to aid in the debugging or validation of the system 100, post-manufacture.

In such an embodiment, a TCR 104 may be configured to output a captured signal 154. In the illustrated embodiment, the TCR 104 may be configured to update the captured signal 154 as time progresses, in order to generate a waveform or signal trace of the captured signal 154. In such an embodiment, a user (not shown) may be able to see how the internal workings of the CLB 102 change over time by looking at the captured trace (i.e. the captured signal 154 may be a function of time).

In the illustrated embodiment, the system 100 may be configured to only record or monitor a sub-set of the signals 152 at a given time. In such an embodiment, the system 100 may include one or more multiplexers 106 or a selection tree 107. In various embodiments, the multiplexers 106 may be configured to select a sub-set of the signals 152 or captured signals 154 for monitoring or recordation. In such an embodiment, the selection tree 107 may result in a set of selected captured signals 156.

In various embodiments, these selected captured signals 156 may be of a predetermined width or number (e.g., 16-bits wide, 128-bits wide, etc.), and may be limited to those captured signals 154 originating from a predetermined number of TCRs 104 (e.g., only one TCR 104, etc.). It is understood that the above are merely a few illustrative examples to which the disclosed subject matter is not limited.

In such an embodiment, the system may include a trace control block (TCB) 108. In such an embodiment, the TCB 108 may be configured to manage the selection and storage of the captured signals 154 or the sub-set thereof. In various embodiments, the selected captured signals 156 may be stored within or by a memory 110, per the TCB 108's management. In various embodiments, the memory 110 may be included by the system 100 as an on-die or on-chip memory. In various embodiments, the memory may be volatile, non-volatile, or a combination thereof.

In such an embodiment, as the system 100 and the CLBs 102 perform various functions (e.g., a floating-point computation, etc.), the TCRs 104 may capture the signals 152. The selection tree 107 may filter those captured signals 154 per the selection process employed by the TCB 108. In various embodiments, the user may establish the selection process or criteria in the TCB 108. These selected captured signals 156 may be stored within the memory 110 to form a waveform or trace 158 of the selected captured signals 156. Once the testing process is over, the user may access the memory 110 to view the trace 158 of the selected captured signals 156. This trace 158 may include a series of snapshots of the signals 152 taken or recorded at periodic intervals (e.g., based upon a triggering event, a predetermined period of time, every clock cycle, etc.). By examining this trace 158, the user may determine what is occurring in the selected CLB 102 and how and why (if at all) a particular test has failed. It is understood that the above is merely one illustrative example to which the disclosed subject matter is not limited.

In various embodiments, the TCR 104 may also be configured to capture whether an event occurred within the combinatorial logic block 102. In such an embodiment, the TCR 104 may be configured to examine the signals 152 and determine if a particular event has occurred within the respective CLB 102. In various embodiments, events may include, but are not limited to, for example, a state of a state-machine, the saturation of a queue, an error condition, etc. In some embodiments, the TCR 104 may include a comparator configured to determine if a selected event has occurred (e.g., to compare a number of signals 152 to a certain pattern, etc.). In another embodiment, a signal 152 in-and-of-itself may indicate that an event has occurred. In some embodiments, each CLB 102 may be associated with their own respective events. It is understood that the above are merely a few illustrative examples to which the disclosed subject matter is not limited.

In various embodiments, the TCR 104 may include "sticky" shadow registers configured to allow a user or debugging agent (e.g., software, etc.) to determine which events occurred and did not occur during a period of operation. In some embodiments, the signals 152 may include events of interest. In various embodiments, the TCRs 104 may be configured to detect or capture these events even when they are not actively being traced or selected by the selection tree 107. In such an embodiment, the event capture and trace capture portions of the TCRs 104 (and selection tree 107, TCB 108, etc.) may operate substantially independently. In various embodiments, one portion may be disabled while the other is enabled, one portion may be selected while the other ignored, both portions may be active, etc. In one such embodiment, the TCR 104 may provide a non-intrusive way of profiling critical events for a given test run. It is understood that the above are merely a few illustrative examples to which the disclosed subject matter is not limited.

In one illustrative embodiment, a TCR 104 may include 16 bytes of input signals 152 and output 5 bytes of captured signals 154. In such an embodiment, the TCR 104 may include a multiplexer to select as output only a sub-portion of the signals 152 or may include the first tier of the selection tree 107. In such an embodiment, the TCR 104 may include 21 bytes (16 bytes plus 5 bytes) of captured event signals 164. In some embodiments, each of these 21 bytes of captured event signals 164 may be associated with respective sticky registers. In yet another embodiment, additional sticky registers and logic may be included to determine various events based upon the input signals 152 (e.g., comparators coupled with registers, etc.). It is understood that the above is merely one illustrative example to which the disclosed subject matter is not limited.

As described below, in various embodiments, the sticky registers may invert signals 152 as desired (e.g., an event resulting in a signal 152 with a value of 0 may be inverted to a positive event signal 164 having a value of 1, etc.). Further, in some embodiments, a reset command may be input to reset the sticky register. In such an embodiment, the reset may allow a user to determine if an event has occurred after the reset signal. In such an embodiment, the sticky event registers may be configured to record continuously or when enabled, and whenever a user wishes to start a new test or set of event values, the sticky register may be reset. It is understood that the above are merely a few illustrative examples to which the disclosed subject matter is not limited.

In one embodiment in which the TCRs 104 are already configured to capture the trace signals 152, the event capturing feature may leverage on-board debug logic and capabilities within the system 100 to allow coverage mapping of post-silicon testing or validation. In such an embodiment, visibility of internal events or signals during normal operation may be provided by repurposing or adding the event capturing functionality to the internal debug logic and registers (e.g., TCRs 104, etc.). Registers, such as TCRs 104, used for debug purposes, may be configured to be sticky profile registers that log the occurrence of events and states. These captured event logs may, in one embodiment, be read or accessed after testing is complete to identify conditions that were hit or missed by the test. In some embodiments, this may provide the user with the ability to adjust their testing strategy based on the coverage and effectiveness of previously executed tests. It is understood that the above is merely one illustrative example to which the disclosed subject matter is not limited.

In one such embodiment, the TCRs 104 may extend the scope of the internal debug logic to include the ability to reconfigure existing debug logic to provide a course debug view mode with simpler configuration, no external instrumentation, and wider event visibility. The event capturing capabilities of the TCRs 104 may also include the ability to collect validation coverage by turning internal events into profile points using significantly less logic and storage than more extensive systems. In one embodiment, a "sticky event" mode may be included that can capture events over a specific time period for use in aiding the debugging of issues as well as profiling the behavior of software or instructions that may be executed by the system 100. It is understood that the above are merely a few illustrative examples to which the disclosed subject matter is not limited.

In various embodiments, the system 100 may include a register access bus 112 configured to access a captured event 164 stored by a TCR 104. In the illustrated embodiment, the captured events 164 may not pass through the selection tree 107 and TCB 108, instead they may be accessed in an orthogonal manner. In such an embodiment, the captured events 164 may be accessed in a non-intrusive manner that does not interfere with the working of the various CLBs 102. For example, writing captured traces to the memory 110 may cause delays in memory accesses by the CLBs 102 (e.g., causing queues to stall, etc.) and the use of the bus 112 may avoid such issues. It is understood that the above is merely one illustrative example to which the disclosed subject matter is not limited.

In one embodiment, each TCR 104 may be assigned an address on the bus 112. In one specific embodiment, the TCR 104 may be treated by the bus as including a fixed length (e.g., 32-bit, etc.) register. In instances in which the TCR 104 event signals 164 are less than the fixed width, padding may occur. It is understood that the above is merely one illustrative example to which the disclosed subject matter is not limited.

In some embodiments, the bus 112 may be readable via an Access Port 114. In some embodiments, the Access Port 114 may include one or more external pins of the system 100 or integrated circuit. In one such embodiment, the Access Port 114 may include a Joint Test Action Group (JTAG) port or port substantially compliant with the IEEE 1149.1 Standard Test Access Port and Boundary-Scan Architecture. Institute of Electrical and Electronics Engineers (IEEE) Computer Society 1149.1-1990—IEEE Standard Test Access Port and Boundary-Scan Architecture. It is understood that the above is merely one illustrative example to which the disclosed subject matter is not limited.

In various embodiments, a user may successively read the captured events 164 from each of the TCRs 104 via the bus 112. In such an embodiment, a set of all the captured events 168 may be output. This differs from the captured signals 154 that, in one embodiment, may only be partially read by selecting a sub-portion via the selection tree 107 and the TCB 108. Further, this may differ from the captured signals 154 in that the system 100 may be configured to store the captured events 164 in the TCRs 104 until any testing is completed, thus allowing the events 164 to be captured without interference to the CLBs 102; whereas, the captured signals 154 may only be temporarily stored by the TCRs 104 and must either be stored in the memory 110 or lost. It is understood that the above are merely a few illustrative examples to which the disclosed subject matter is not limited.

In various embodiments, the selection tree 107 and TCB 108 may be included in a first output path. In such an embodiment, the first output path may be configured to select between a plurality of captured signals provided by respective trace control registers. In various embodiments, the bus and access port 114 may be included in a second output path. In such an embodiment, the second output path may be configured to output one or more captured events provided by one or more respective trace control registers.

In one example embodiment, a user may wish to validate or otherwise test the system 100 after the manufacturing process is complete. In some embodiments, this may occur as part of post-silicon validation. In another embodiment, this may occur as part of a debug process in the field. It is understood that the above are merely a few illustrative examples to which the disclosed subject matter is not limited.

In such an embodiment, the user may configure the events to be monitored. In various embodiments, this may be done in the same manner that signal capturing would be configured. In some embodiments, this may occur via or with the aid of the TCB 108. The user may enable the coverage or event capturing mode, if needed. The user may then run the desired tests (e.g., applications, diagnostics, human driven interaction, etc.) for whatever period of time is desired (e.g., seconds, minutes, hours, days, weeks, etc.). In such an embodiment, upon the completion of the testing, or upon the occurrence of a checkpoint (e.g., an exception, an interrupt, etc.), the user or testing agent (e.g., software, etc.) may read the TCRs 104 or event capturing portions thereof. In various embodiments, the user may then reset the TCRs 104, or leave them as is (based upon the user's desire). In one such embodiment, if the TCRs 104 are not reset the captured event information may be aggregated or accumulated between tests or regardless of checkpoints. It is understood that the above is merely one illustrative example to which the disclosed subject matter is not limited.

In various embodiments, the capturing of events may provide the ability to monitor or determine critical event coverage. In such an embodiment, events may include events that are or should occur to allow validation confidence in the product as well as events that should never occur in the field. In various embodiments, the concept of event capturing may be similar in nature to that of coverage points and assertion checkers used in pre-silicon design verification.

In such an embodiment, event coverage may allow a deeper understanding of workloads and their effects on the architecture of the system 100 by extending the performance counter concept to provide information (breadcrumbs) to validation engineers. Validation may, in various embodiments, be optimized for both coverage (e.g., picking the applications that best cover portions of our architecture, etc.) as well as completion time (e.g., focusing on the proper subset of tests to minimize time to validate revisions, etc.). Event coverage is also useful during the debug and root cause of failing devices. The invention allows access to far more events than can be monitored when using in debug mode (e.g., selection tree 107, TCB 108, etc.), which allows the ability to either assure the stimulus applied is enabling the key conditions required to replicate a bug, or to rule out certain behaviors and areas of the circuitry as the root cause of the failure. It is understood that the above are merely a few illustrative examples to which the disclosed subject matter is not limited.

Figure 2:
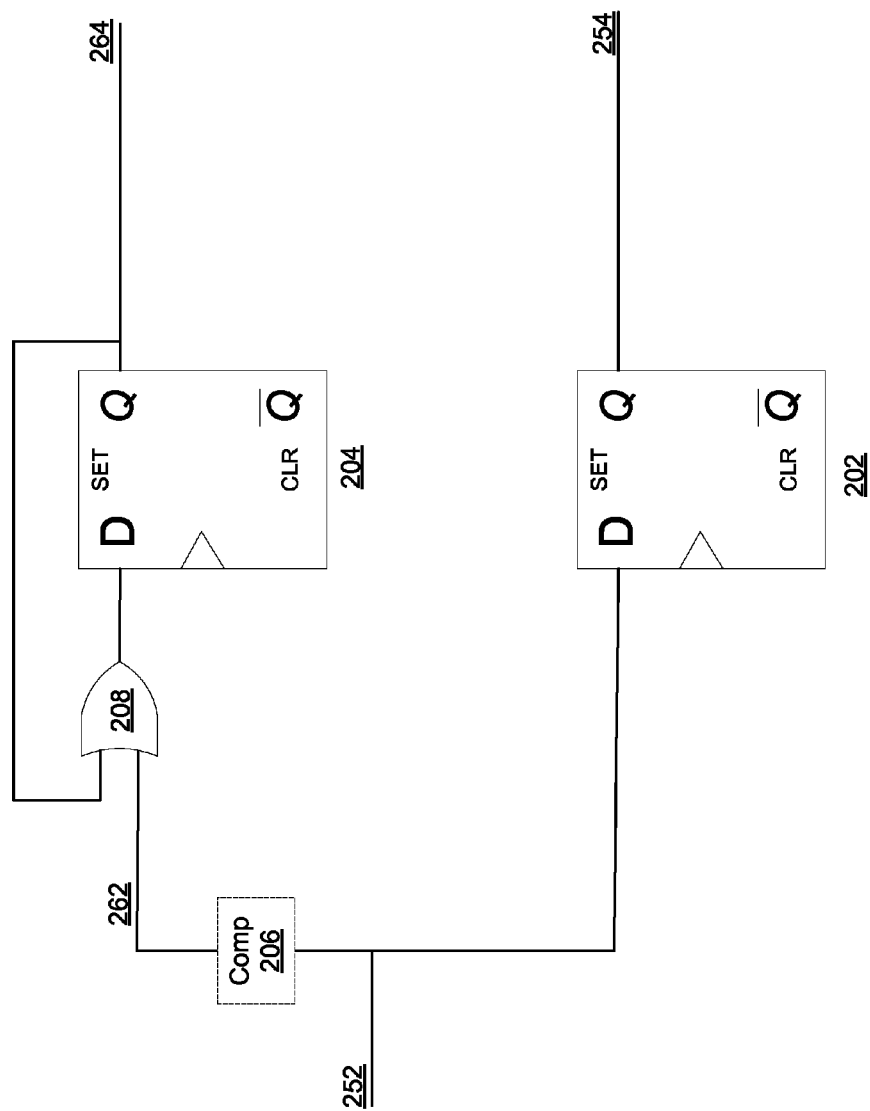
FIG. 2 is a block diagram of an example embodiment of a circuit in accordance with the disclosed subject matter.

FIG. 2 is a block diagram of an example embodiment of a circuit 200 in accordance with the disclosed subject matter. In various embodiments, the circuit 200 may be part of or included by a trace control register, as described in reference to FIG. 1. Specifically, the circuit 200 illustrates a single bit register circuit configured to capture a signal 252 included or provided by a combinatorial logic block and capture whether an event occurred within the combinatorial logic block, wherein the occurrence of the event is determined by the signal 252 having a predetermined state. It is understood that the above is merely one illustrative example to which the disclosed subject matter is not limited.

In the illustrated embodiment, the circuit 200 may include a debug register 202 configured to temporarily store a captured signal 254. In the illustrated embodiment, the debug register 202 is illustrated as including a D-flip-flop but it is understood that the above is merely one illustrative example to which the disclosed subject matter is not limited. Specifically, in the illustrated embodiment, the debug register 202 may receive the signal 252 from the CLB (not shown in FIG. 2) at the D input, and temporarily store that signal 252, thus generating the captured signal 254. In the illustrated embodiment, the signal 252 may only be captured for a single clock cycle (however, other embodiments are contemplated), and as such if the captured signal 254 is not selected by the TCB or similar trace management unit, the captured signal 254 may be lost.

In the illustrated embodiment, the circuit 200 may include a coverage register 204 configured to record, in a sticky manner, if an event 262 has occurred. Again, in the illustrated embodiment, the coverage register 204 is illustrated as including a D-flip-flop but it is understood that the above is merely one illustrative example to which the disclosed subject matter is not limited.

In the illustrated embodiment, the circuit 200 may include a comparator 206 configured to determine if the signal 252 (or a plurality of such signals) are equal to a predefined state. In various embodiments, the comparator 206 may be programmed prior to the execution of a test. For example, four signals 252 taken together may represent the states of a state-machine internal to the CLB. The comparator 206 may be configured to examine the four signals 252 and determine if a certain state has been achieved. While FIG. 2 only shows a 1-bit version of circuit 200, a multiple bit version is understood without difficulty. In one version of the illustrated embodiment, the circuit 200 may not include a comparator 206 as the signal 252 may indicate the existence of a given event signal 262. It is understood that the above are merely a few illustrative examples to which the disclosed subject matter is not limited.

In the illustrated embodiment, the event signal 262 may be input into the D input of the coverage register 204. In various embodiments, once the existence of an event 262 has been detected, a feedback mechanism 208 (illustrated as an OR gate in this example embodiment) may be employed to make the captured event signal 264 sticky. In this context, the term "sticky" means that once a bit or signal has become set it will not normally be reset or cleared (absent a reset signal, as described below). In such an embodiment, the event signal 262 may be semi-permanently captured and may remain until explicitly reset or cleared. As such, a user or testing agent need not worry about reading or storing the captured event signal 264 until the test is completed or the opportunity is otherwise convenient.

Figure 3:
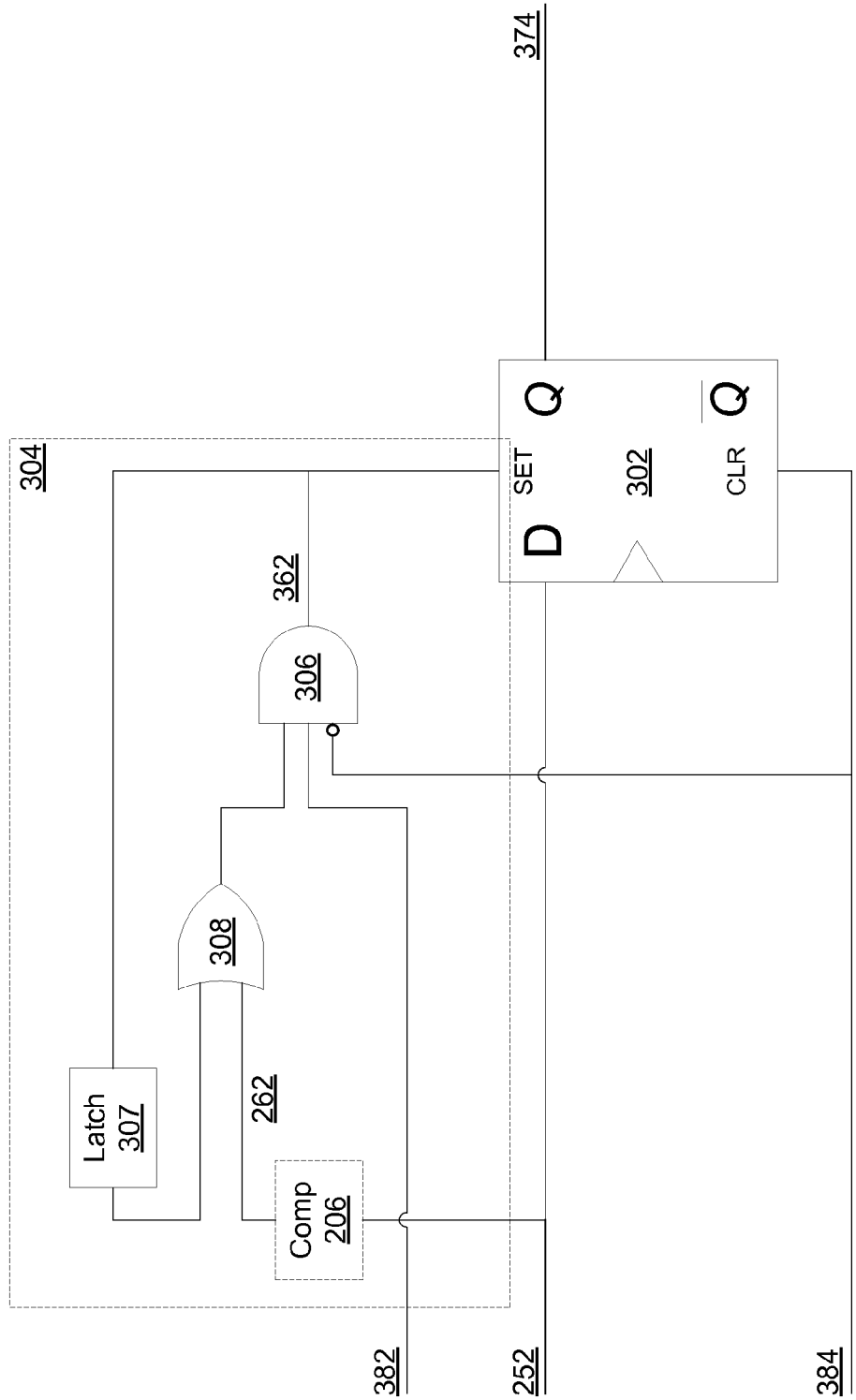
FIG. 3 is a block diagram of an example embodiment of a circuit in accordance with the disclosed subject matter.

FIG. 3 is a block diagram of an example embodiment of a circuit 300 in accordance with the disclosed subject matter. In various embodiments, the circuit 300 may be part of or include by a trace control register, as described in reference to FIG. 1. Specifically, the circuit 300 illustrates a single bit register circuit configured to capture a signal 252 included or provided by a combinatorial logic block and capture whether an event occurred within the combinatorial logic block, wherein the occurrence of the event is determined by the signal 252 having a predetermined state. It is understood that the above is merely one illustrative example to which the disclosed subject matter is not limited.

In the illustrated embodiment, the circuit 300 includes a single register 302 that is configured to capture both the signal 252 and the occurrence of an event. Again, in the illustrated embodiment, the coverage register 204 is illustrated as including a D-flip-flop but it is understood that the above is merely one illustrative example to which the disclosed subject matter is not limited.

In one embodiment, the circuit 300 may be configured to operate in one of two modes: a debug or trace capture mode, and a coverage or event capture mode. In the illustrated embodiment, the circuit 300 may receive a mode signal 382 to indicate which mode the circuit 300 is to operate in. In one embodiment, the mode signal 382 may be set to enable a first path (e.g., a selection tree, etc.) during debug, then switched to enable a second path (e.g., captured event signals, register access bus, etc.) for profile data collection.

When operating in a debug or trace capture mode, the register 302 may receive the signal 252 via the D input of the flop-flop. This signal may be temporarily stored and output via the Q output as the captured signal 374. As described above, this captured signal 374 may then be selected (or not) by the selection tree and TCB and stored in a memory.

When operating in a coverage or event capture mode, the circuit 300 may ultimately receive the signal 252 via the Set input of the register 302. In the illustrated embodiment, the signal 252 may be input to the circuit 300 and may be examined by a comparator 206, depending upon the embodiment. Once the existence of an event has been determined, the event signal 262 may be generated.

The event signal 262 may be gated or controlled by an enablement circuit 306 (illustrated as an AND gate). In various embodiments, the enablement circuit 306 may be configured to prevent the event signal 262 from causing the register 302 to set (overriding the D input) if the circuit 300 is not in the coverage mode. However, if the circuit 300 is in coverage mode, the enablement circuit 306 may cause the register 302 to Set or go to a value of 1, regardless of the D input. In such an embodiment, the ability to capture the signal 252 directly may be overridden. In various embodiments, the trace control register may be dynamically configurable to either capture one or more signals or capture whether an event occurred. In such an embodiment, when in capture mode, the output signal 374 may include the captured event signal, instead of the temporally captured signal. It is understood that the above is merely one illustrative example to which the disclosed subject matter is not limited.

In one embodiment, a feedback circuit may be employed to make the output of the enablement circuit 306 (e.g., the enabled event signal 362, etc.) to be sticky or remain set. In the illustrated embodiment, the feedback circuit may include a latch 307 and an OR gate 308. It is understood that the above is merely one illustrative example to which the disclosed subject matter is not limited.

In some embodiments, the enabled event signal 362 may be sent to a first path (e.g., a selection tree, etc.) during a debug mode, then switched to a second path (e.g., captured event signals, register access bus, etc.) for profile data collection. In such an embodiment, the enabled event signal 362 may be captured via either path, but it two different modes. It is understood that the above is merely one illustrative example to which the disclosed subject matter is not limited.

In various embodiments, the circuit 300 may include a reset signal 384. In such an embodiment, the reset signal 384 may be input into the Clear input of the register 302 and when set may cause the register 302 to clear or output a 0 at the Q output terminal. In one embodiment, the reset signal 384 may also be input into the enablement circuit 306 to clear the enabled event signal 362. As described above, in various embodiments, the reset signal 384 may be employed to clear the sticky event capture signal 374, such that a new set of tests may be executed or prior test results may be ignored or cleared.

In the illustrated embodiment, the circuit 300 may be considered to include two portions. A first portion may include the D input and may process debug or trace capture mode. A second portion 304 may include the circuits (e.g., circuits 206, 306, 307, and 308, etc.) configured to process coverage or event capture mode. It is understood that the above are merely a few illustrative examples to which the disclosed subject matter is not limited.

Figure 4:
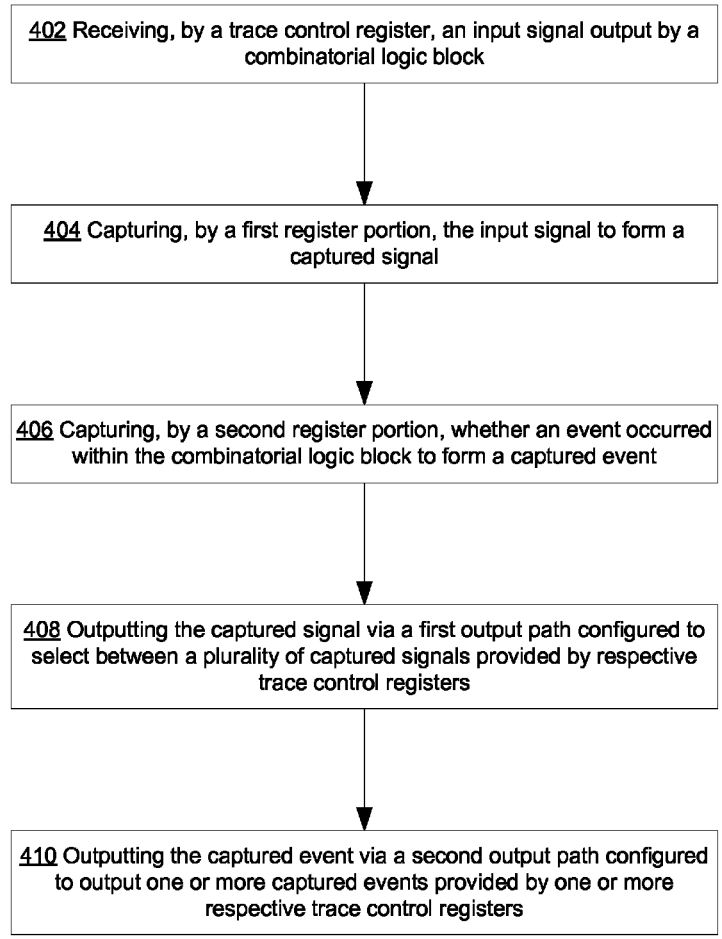
FIG. 4 is a flowchart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIG. 1, 2, 3, or 5. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, an input signal may be receiving by a trace control register, as described above. In various embodiments, the input signal may have been output by a combinatorial logic block, as described above. In various embodiments, one or more of the action(s) illustrated by this Block may be performed by the apparatuses or systems of FIG. 1, 2, or 3, the trace control registers of FIG. 1, 2, or 3, as described above.

Block 404 illustrates that, in one embodiment, a first register portion may capture the input signal to form a captured signal, as described above. In various embodiments, capturing the input signal to form a captured signal may include determining if the register is operating in a debug mode, as described above. In one such embodiment, if the register is operating in the debug mode, the input signal may be captured to form the captured signal, as described above. In some embodiments, if the register is not operating in the debug mode, the captured signal may not be formed or captured, as described above. In another embodiment, capturing the input signal to form a captured signal may include capturing the input signal, regardless of whether the captured signal is selected for output via the first output path, as described above. In various embodiments, one or more of the action(s) illustrated by this Block may be performed by the apparatuses or systems of FIG. 1, 2, or 3, the trace control register of FIG. 1, the debug register of FIG. 2, the first portion of the register of FIG. 3, as described above.

Block 406 illustrates that, in one embodiment, a second register portion may capture whether an event occurred within the combinatorial logic block and form a captured event, as described above. In various embodiments, the occurrence of the event may be based, at least in part, upon the input signal, as described above. In some embodiments, the second register portion may include a coverage register configured to record in a sticky manner if an event has occurred, as described above. In various embodiments, capturing whether an event occurred within the combinatorial logic block and forming a captured event may include capturing whether the event occurred in a sticky fashion, and if a reset signal is received, clearing the captured event, as described above. In various embodiments, one or more of the action(s) illustrated by this Block may be performed by the apparatuses or systems of FIG. 1, 2, or 3, the trace control register of FIG. 1, the coverage register of FIG. 2, the second portion of the register of FIG. 3, as described above.

Block 408 illustrates that, in one embodiment, the captured signal may be output via a first output path configured to select between a plurality of captured signals provided by respective trace control registers, as described above. In some embodiments, the first output path may include a selection tree configured to select between a plurality of captured signals provided by respective trace control registers, as described above. In one such embodiment, the first output path may include a trace control block configured to manage the selection and storage of the captured signals, as described above. In such an embodiment, the first output path may include a memory configured to store a trace of the captured signals selected by the trace control block, as described above. In various embodiments, one or more of the action(s) illustrated by this Block may be performed by the apparatuses or systems of FIG. 1, 2, or 3, the trace control register of FIG. 1, the selection tree, trace control block, and/or memory of FIG. 1, as described above.

Block 410 illustrates that, in one embodiment, the captured event may be output via a second output path configured to output one or more captured events provided by one or more respective trace control registers, as described above. In some embodiments, outputting the captured event via a second output path may include receiving an access request for the captured event, via a register access bus, as described above. In one such embodiment, outputting the captured event via a second output path may include outputting the captured event to an access port, via the register access bus, as described above. In various embodiments, one or more of the action(s) illustrated by this Block may be performed by the apparatuses or systems of FIG. 1, 2, or 3, the trace control register of FIG. 1, the register access bus, and/or access port of FIG. 1, as described above.

Figure 5:
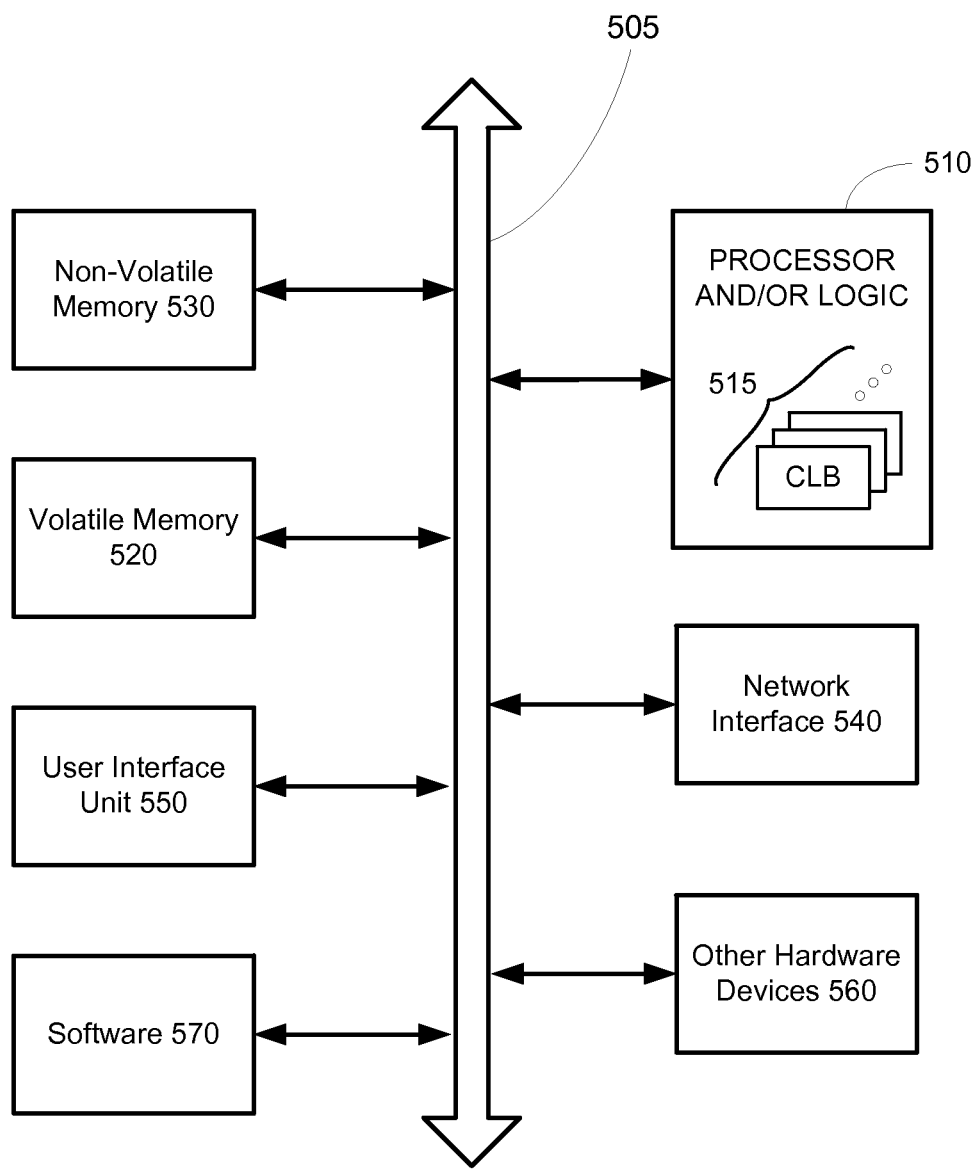
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM), etc.). The information processing system 500 according to the disclosed subject matter may further include a non-volatile memory 530 (e.g., a hard drive, an optical memory, a NAND or Flash memory, etc.). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 500 according to the disclosed subject matter may further include a user interface unit 550 (e.g., a display adapter, a haptic interface, a human interface device, etc.). In various embodiments, this user interface unit 550 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor, etc.). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540, etc.) of the information processing system 500. In such an embodiment, the information processing system 500 may include one or more native applications, which may be installed locally (e.g., within the non-volatile memory 530, etc.) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a trace control register configured to receive one or more signals output by a combinatorial logic block, wherein the trace control register comprises:
      a first register portion configured to capture the one or more signals, and
      a second register portion configured to capture whether an event has occurred at least once within the combinatorial logic block during a testing period, wherein the occurrence of the event is determined by at least a portion of the one or more signals having a predetermined state;
   a first output path configured to select between a plurality of captured signals provided by respective trace control registers; and
   a second output path configured to output one or more captured events provided by one or more respective trace control registers.

2. The apparatus of claim 1, wherein the first register portion comprises a debug register configured to temporarily store a captured signal.

3. The apparatus of claim 2, wherein the second register portion comprises a coverage register configured to record in a sticky manner if an event has occurred.

4. The apparatus of claim 1, wherein the trace control register is dynamically configurable to either capture one or more signals, capture whether an event occurred, or both.

5. The apparatus of claim 1, wherein the first output path comprises:
   a multiplexor network configured to select between a plurality of captured signals provided by respective trace control registers;
   a trace control block configured to manage the selection and storage of the captured signals; and
   a memory configured to store a trace of the captured signals selected by the trace control block.

6. The apparatus of claim 1, wherein the second output path comprises:
   a register access bus configured to access a captured event stored by the trace control register.

7. The apparatus of claim 1, wherein the trace control register comprises a reset input configured to clear a captured event.

8. The apparatus of claim 1, wherein the second output path is configured to access the captured events in a way that is non-intrusive to a functioning of the combinatorial logic block.

9. The apparatus of claim 1, wherein the trace control register is configured to capture events regardless of whether the captured signals are selected for output via the first output path.

10. A method comprising:
    receiving, by a trace control register, an input signal output by a combinatorial logic block;
    capturing, by a first register portion, the input signal to form a captured signal;
    capturing, by a second register portion, whether an event has occurred at least once within the combinatorial logic block during a testing period to form a captured event, wherein the occurrence of the event is based, at least in part, upon the input signal;
    outputting the captured signal via a first output path configured to select between a plurality of captured signals provided by respective trace control registers; and
    outputting the captured event via a second output path configured to output one or more captured events provided by one or more respective trace control registers.

11. The method of claim 10, wherein the first register portion comprises a debug register configured to temporarily store a captured signal.

12. The method of claim 11, wherein the second register portion comprises a coverage register configured to record in a sticky manner if an event has occurred.

13. The method of claim 10, wherein capturing the input signal to form a captured signal comprises:
    determining if the trace control register is operating in a debug mode;
    if the register is operating in the debug mode, capturing the input signal to form the captured signal; and
    if the register is not operating in the debug mode, not forming the captured signal.

14. The method of claim 10, wherein the first output path comprises:
    a selection tree configured to select between a plurality of captured signals provided by respective trace control registers;
    a trace control block configured to manage the selection and storage of the captured signals; and
    a memory configured to store a trace of the captured signals selected by the trace control block.

15. The method of claim 10, wherein outputting the captured event via a second output path comprises:
    receiving an access request for the captured event, via a register access bus; and
    outputting the captured event to an access port, via the register access bus.

16. The method of claim 10, wherein capturing whether an event occurred within the combinatorial logic block to form a captured event comprises:
    capturing whether the event occurred in a sticky fashion; and
    if a reset signal is received, clearing the captured event.

17. The method of claim 10, wherein capturing the input signal to form a captured signal comprises capturing the input signal, regardless of whether the captured signal is selected for output via the first output path.

18. A system comprising:
    a trace control register configured to receive one or more signals, wherein the trace control register comprises:
       a first register portion configured to generate one or more captured signals by capturing the one or more signals, and
       a second register portion configured to capture whether an event has occurred at least once within a combinatorial logic block during a testing period, wherein the occurrence of the event is determined by at least a portion of the one or more signals;

a memory configured to store the one or more captured signals; and an access port configured to output the captured event.

19. The system of claim 18, wherein the first register portion comprises a debug register configured to temporarily store a captured signal.

20. The system of claim 19, wherein the second register portion comprises a coverage register configured to record in a sticky manner if an event has occurred.

21. The system of claim 19, wherein the trace control register is dynamically configurable to either capture one or more signals, capture whether an event occurred, or both.

22. The system of claim 19, wherein the access port and the trace control register are communicatively coupled via a register access bus.

23. The system of claim 19, wherein the trace control register is configured to capture the events in a way that is non-intrusive to a performance of a logical operation of the combinatorial logic block.

\* \* \* \* \*